United States Patent

Rosenberg

[11] Patent Number: 5,815,624
[45] Date of Patent: Sep. 29, 1998

[54] OPTICAL FIBER VIEWING APPARATUS

[76] Inventor: Gary J. Rosenberg, 724 Glouchester St., Boca Raton, Fla. 33487

[21] Appl. No.: 705,785

[22] Filed: Aug. 30, 1996

[51] Int. Cl.$^6$ .................................................. G02B 6/04
[52] U.S. Cl. ........................ 385/115; 385/116; 385/119; 385/120; 385/33
[58] Field of Search ...................... 385/115, 120, 385/35, 31, 32, 33, 34

[56] References Cited

U.S. PATENT DOCUMENTS

| | | | |
|---|---|---|---|
| 4,516,832 | 5/1985 | Jain et al. | 385/121 |
| 4,968,124 | 11/1990 | Deckert et al. | 350/574 |
| 5,377,287 | 12/1994 | Lee et al. | 385/3.5 |

*Primary Examiner*—Phan T. H. Palmer
*Attorney, Agent, or Firm*—McHale & Slavin

[57] ABSTRACT

A blind spot viewing system capable of transferring an optical image between two locations by use of a coherent bundle of optical fibers with a lenslet array placed on each end of the bundle or formed integral thereto. The lenslet input assembly focuses light onto the core of each optical fiber in the coherent bundle. The output of the coherent bundle is also coupled to a lenslet array wherein each lens in the array is positioned along the output end of the coherent optical fiber bundle to collect the light emerging from the single optical fiber for focusing it towards a viewing position. Alternatively, the ends of the optical fibers can be modified to include a focusing lenslet. The viewing position might include a direct viewing or charge coupled device (CCD) for subsequent viewing on a video monitor.

20 Claims, 3 Drawing Sheets

OPTICAL FIBER VIEWING APPARATUS

FIELD OF THE INVENTION

This invention relates generally to the field of vehicle safety and, more particularly, to the use of a coherent bundle of optical fibers employing a parallel processing lens allowing image transfer for viewing of blind spots.

BACKGROUND OF THE INVENTION

The inability to view an area from a particular position is commonly referred to as a blind spot. Blind spots are especially dangerous during the operation of any type of vehicle, whether the vehicle is a semi truck or an economy car. To reduce the problem with blind spots, prior art teaches numerous devices from as simplistic as a mirror to the elaborate use of video cameras.

Blind spots are not limited to vehicles driven on a road. For instance, a fork lift driver must constantly maneuver a vehicle in close quarters while moving objects that inevitably create large blind spots. If the operator relies upon another person to direct the placement of the objects, dual wages become an expensive overhead. Typically, the operator commits the area to memory during the instant there was a clear field of vision and then blindly sets the objects into position. The hope is that the area remains clear of any obstacle during the move through the blind spot. While a skilled fork lift driver can minimize mishaps, it is impossible to eliminate mishaps without eliminating the blind spot.

Vehicles driven on the road present blind spots that are more readily apparent to the average consumer. As the size of the vehicle increases, the blind spot increases geometrically. For instance, the driver of a bus has an extremely limited field of vision due to the length of the bus and the positioning of the driver. For this reason, prior art teaches a number of devices to assist the operator in either viewing the blind spot or from preventing an egress into the blind spot. School buses are commonly outfitted with crossing bars that force children to walk around the bar and into the drivers field of vision. The bars are only for use in stationary positions. Airport buses typically include the use of a video camera to eliminate the blind area at the rear of the bus. A problem with video cameras is the cost and related upkeep. Moreover, electronics are sensitive to various environmental conditions such as humidity, heat, cold, shock, and/or vibration. Electronics are also affected by external electronic noise sources produced by other such devices and/or machinery.

A field of vision might be expanded by the use of convex mirrors but is of limited assistance, as lens distortion may give the operator a false indication of a blind spot. In addition, mirrors must be placed in an extended position to view around objects requiring elaborate supports in order to withstand normal vehicle operation.

Optical fibers are yet another device capable of elimination of a blind spot. The optical fiber is used in transmitting an image projected on one end of a fiber and reproduced at the other end by the use of a magnifier. Clarity and complexity of the image transmitted is a resulting factor to be considered in determining whether or not the use of fiber optics is a commercially viable means for image transfer in low-cost commercial or industrial applications.

U.S. Pat. No. 4,968,124 discloses an optical fiber system for use in addressing blind spot situations. This technology allows an image from an objective assembly to travel through an image relay system to a viewer assembly mounted in a vehicle. The image relay system comprises a fiber optic cable coupled to a periscope assembly. The device consists of a housing having a glass aperture coupled to a lens system and to the receptor end of a fiber optic cable. The image passes through the end of the fiber optic cable to emerge at the emitter end of the fiber optic cable in a periscope assembly or directly into a viewer assembly. The inventor defines a viewer assembly as a housing with a mounting aperture and a viewing aperture. The image enters the viewer assembly and is directed through a suitable lens so that the vehicle operator can perceive the viewed object. As noted by the disclosure, the problem with this art of a conventional cable is the loss of light which limits the length as well as effectiveness of the device. In low light conditions, the '124 device could be rendered useless. In addition, in vehicles needing elimination of a blind spot which is a distance from the operator, such as in buses, semi-trucks, and large boats, the '124 device has severe limitations, making it inappropriate for a majority of such applications. The restrictive image limitation of the assembly, discussed within the disclosure regarding the loss of light, severely limits the image utility. Moreover, the related inability of the system to effectively use a cable extending over a long length of space, that is 40 feet, is problematic.

What is lacking in the art is a device for elimination of blind spots having minimal light loss. Additionally a device is needed which is capable of eliminating a blind spot without distortion from either a periscope type vision system or a convex mirror or set of mirrors. In this manner, a coherent bundle of optical fibers is proposed that eliminates the scrambling relationship between input fibers and output fibers so as to maintain geometric relationship between a projected input image and output image. Additionally, a lenslet array is used to properly focus light into the core of the optical fibers in the coherent bundle at the input end. A similar lenslet array can also be used at the output end to refocus the transmitted light for direct viewing or onto a receiving device. This apparatus might also be used in such applications as endoscopic imaging, security, and surveillance.

SUMMARY OF THE INVENTION

The present invention is a blind spot viewing system capable of transferring an optical image between two locations by use of a coherent bundle of optical fibers with a lenslet array placed on each end of the bundle or formed integral thereto. Such a lenslet array includes a planar microlens array (PML). Gradient index (GRIN) lenses and arrays of GRIN lenses might also be used. SELFOC lenses utilize a radial index gradient.

The cladding around the core of each optical fiber provides internal reflection which allows light to travel through the fiber without loss of strength, even if the fiber is curved. In an optical fiber, the transmission of light is dependent upon the total internal reflection with light traveling inside the fiber and striking the outside surface at an angle of incidence greater than the critical angle, so that all of the light is reflected towards the inside of the fiber without loss of strength. In this manner, light can be transmitted over long distances by being reflected inwardly. The cladding is typically a glass layer of much lower refractive index.

The lenslet input assembly of the present invention is used to focus light onto the core of each optical fiber in the coherent bundle. This is important because light which improperly enters the fiber and falls on the cladding does not contribute to image transfer along the optical fiber bundle, such light is either lost or distorted. Thus, each lenslet in the array focuses light from its individual field of view into the core of a single optical fiber. The output of the coherent bundle is also coupled to a lenslet array wherein each lens in the array is positioned along the output end of the coherent optical fiber bundle to collect the light emerging from the single optical fiber for focusing it towards a viewing position.

An alternative embodiment utilizes a camera lens assembly to further increase the light gathering power of the system. In this manner, the camera lens assembly focuses its field of view onto the input face of a lenslet array.

Still another embodiment involves coupling the output of the fiber optic coherent bundle to a CCD array which has non-absorbing regions between the pixels. A microlens array is used to collect the diverging beam from each individual fiber and to focus the beam onto an active region of each pixel site of the CCD array.

Accordingly, an objective of the present invention is to disclose a blind spot viewing system that provides image transfer with minimal loss of light and without distortion of the viewed image via use of a coherent fiber optic bundle.

Another objective of the present invention is to provide a blind spot viewing system with an input assembly lenslet array for focusing incoming light into the core of individual optical fibers in the fiber optic bundle.

Still another objective of the present invention is to provide a blind spot viewing system with an output assembly lenslet array for collecting light emerging from each individual optical fiber and focusing the emerging light toward a viewing position.

Yet another objective of the present invention is to provide a blind spot viewing system with an output assembly which is coupled to a CCD array, with a lenslet array collecting the diverging beam from each individual fiber and focusing it onto the active region of each pixel site on the CCD array.

Still another objective of the present invention is to provide a blind spot viewing system which uses a camera lens assembly to further increase the light gathering power of the system by focusing the field of view onto the face of the input assembly lenslet array.

Yet another objective of the present invention is to provide a blind spot viewing system as described above which uses gradient index lenses and lens arrays.

Still another objective of the present invention is to provide a blind spot viewing apparatus wherein the optical fiber bundle is sorted into two bundles with a first proximal end of one of said sorted bundles coupled to a light source for illumination of objects at a second distal end of said sorted bundles wherein a second sorted bundle is used for viewing said illuminated objects.

Other objectives and advantages of this invention will become apparent from the following description taken in conjunction with the accompanying drawings wherein are set forth, by way of illustration and example, certain embodiments of this invention. The drawings constitute a part of this specification and include exemplary embodiments of the present invention and illustrate various objects and features thereof.

BRIEF DESCRIPTION OF THE DRAWINGS

FIG. 6 shows a side cutaway view of a normal lens and its affect on light rays passing through.

FIG. 7 shows a side cutaway view of a gradient index lens and its affect on light rays passing through.

DETAILED DESCRIPTION

Although the invention will be described in terms of a specific embodiment, it will be readily apparent to those skilled in this art that various modifications, rearrangements and substitutions can be made without departing from the spirit of the invention. The scope of the invention is defined by the claims appended hereto.

Figure 1:
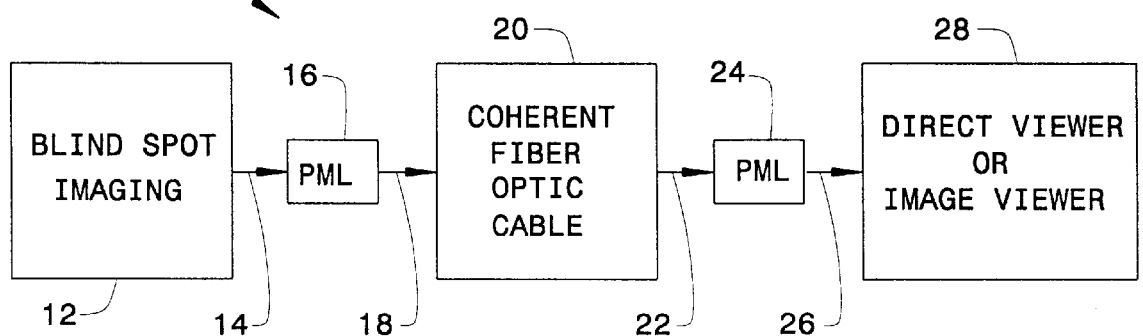
FIG. 1 shows a block diagram of the blind spot viewing apparatus.

Referring now to FIG. 1, a block diagram is shown of the blind spot viewing apparatus 10. Block 12 shows the initial blind spot imaging source. This image source might be the actual image itself, a projection of such image, or a focused collection of light from such image. The light 14 is sent through the input assembly PML 16 for focusing. A PML is a unique, two-dimensional lens array that integrates ion-exchange technology and photolithography. By diffusing ions through a photolithographic mask into a glass substrate, numerous microscopic lenslet may be formed in a multitude of sizes and patterns. An optional swelled curvature may be created on the surface of each lenslet to increase the numerical aperture if necessary. The PML is available in formats designed around various applications. The focused light 18 from the PML lenslet is focused onto the core of individual optical fibers of the coherent fiber optic cable 20. The light travels down each optical fiber and enters 22 the lenslet of the output assembly PML 24. The emitted light 26 is focused onto an image viewer 28 which might include a CCD array which is connected to electronic viewing equipment.

Figure 2:
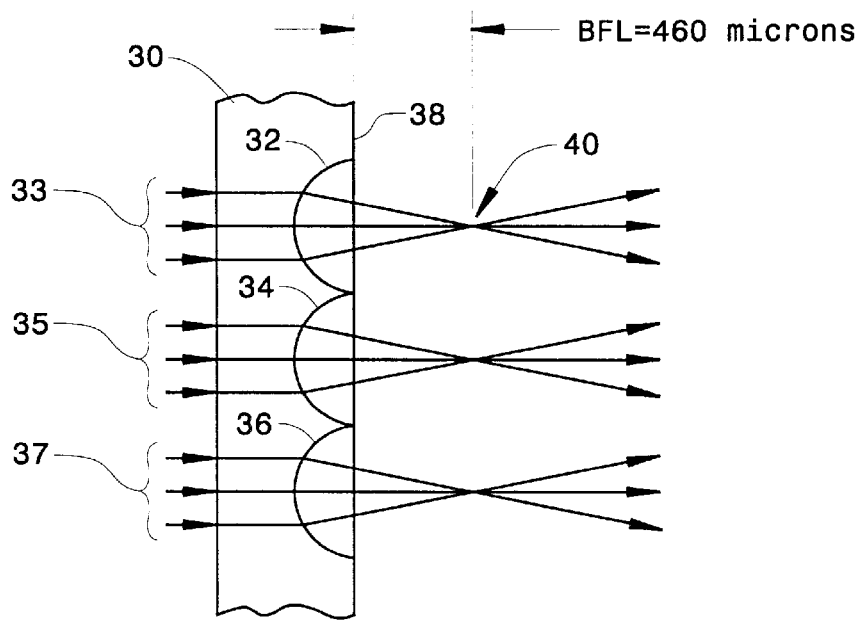
FIG. 2 shows a side cutaway view of a sample portion of a PML array with ray tracings of light paths.
Figure 2A:
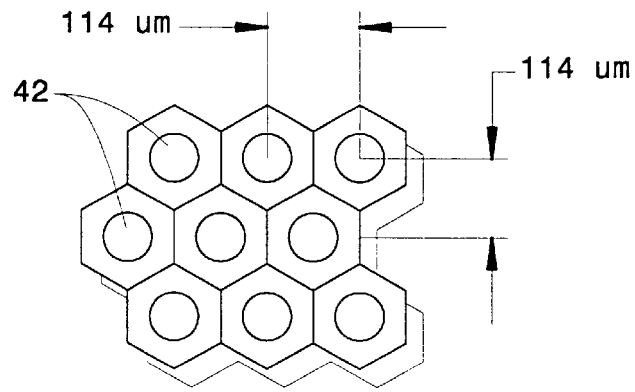
FIG. 2A shows a front view of the PML array.

Referring now to FIG. 2, a side cutaway view of a portion of a PML array 30 is shown. Individual lenslets 32, 34, and 36 are shown arranged across the planar face 38 of the array. Each lenslet 32, 34, and 36 collects light from its respective field of view 33, 35, and 37. The collected light is focused by each lenslet to converge at a predetermined base focal length (BFL) 40, by way of illustration a focal length equal to 460 microns is shown. FIG. 2A shows a front view of the lenslets arrangement across the face 38 of the PML array. The lenslets 42 are arranged in a honeycomb fashion with the center of each lenslets separated by approximately 114micrometers. Such PML arrays could be constructed using other layout arrangements, measurements, and base focal lengths, as needed for different applications.

Figure 3:
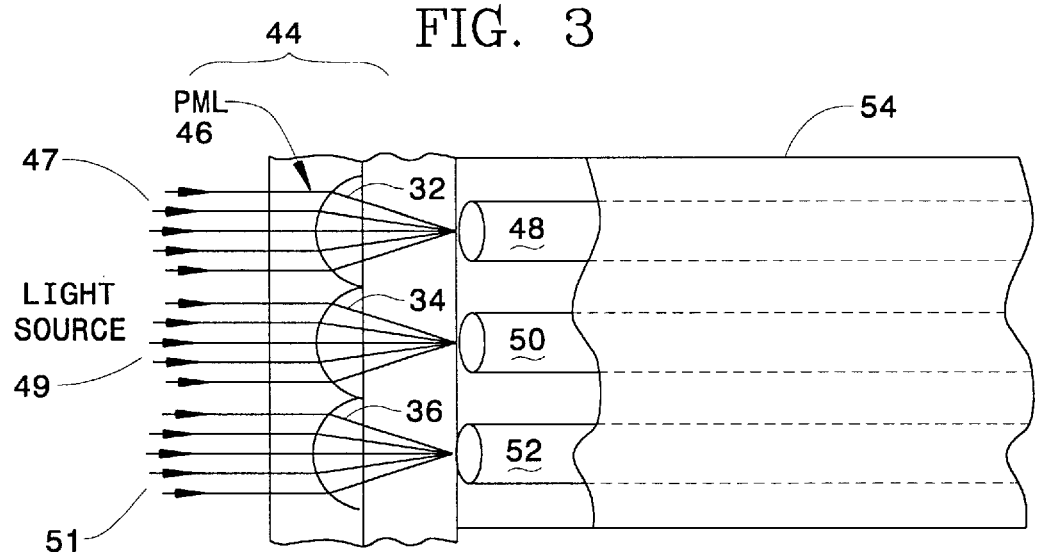
FIG. 3 shows a side cutaway view of an input assembly PML with the lenslet aligned with individual optical fibers for focusing collected light into the optical fiber cores.

Referring now to FIG. 3, a side cutaway view of a portion of a PML array 46 is shown as part of a light input assembly 44. As similar to FIG. 2, each lenslet 32, 34, and 36 of the PML is used to focus field of view light 47, 49, and 51 into the center of individualized optical fibers 48, 50, and 52 which make up the fibers of the coherent fiber optic cable. A coherent bundle of optical fibers is a bundle that does not scramble the relationship between input fibers and output fibers. Thus, for example, if a letter "g" is projected into the input end of the bundle, the same letter "g" will appear, without geometric distortion at the output end of the bundle.

According to the present invention, the light input assembly 44 is constructed so that each lenslets in the array corresponds with an individual optical fiber. For this application, the lenses in a lenslet array must exactly match the closely packed configuration of the coherent optical fiber bundles 54. Present technology readily allows construction of such lenslet arrays. Currently there are at least three mechanisms used individually or in combination to make lenslet arrays. The optical power can be created at each individual lens site in the array by (1) refractive index variation within the bulk material, e.g. a refractive lens using diffusion, (2) shaping the bulk material in an analog manner, e.g. a refractive lens using molded epoxy, or (3) shaping the bulk material in a digital manner, e.g. a diffractive lens using etching.

Figure 4:
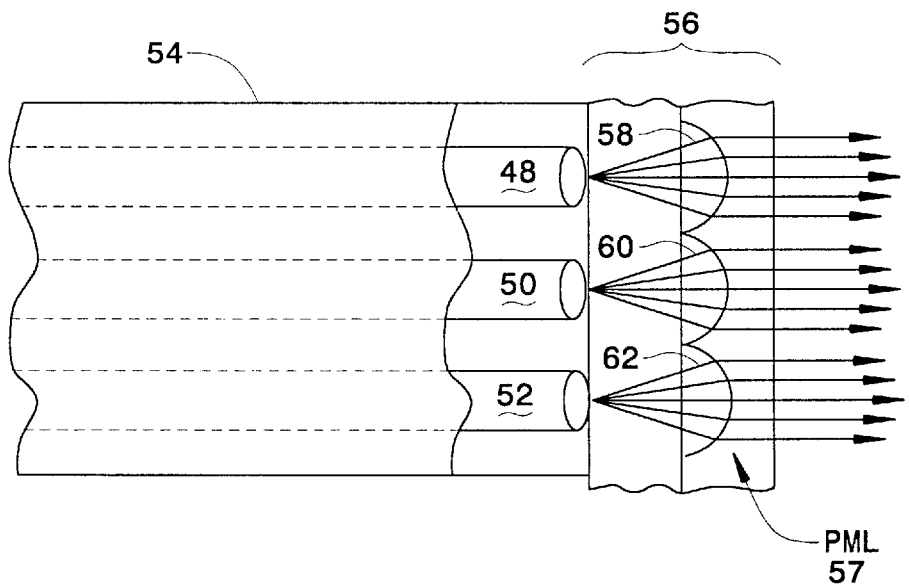
FIG. 4 shows a side cutaway view of an output assembly PML with the lenslet aligned with individual optical fibers for collecting and refocusing light emitting from each optical fiber.

Referring now to FIG. 4, an output assembly 56 is shown with a PML array 57 located at the output end of the coherent optical fiber bundle 54. Each individual optical fiber 48, 50, and 52 aligns with the respective lenslets 58, 60, and 62 in the output PML array 57. These lenslets collect light from each optical fiber and focus the light for direct viewing or for use by a light collecting source or other viewer (see FIG. 5).

Figure 5:
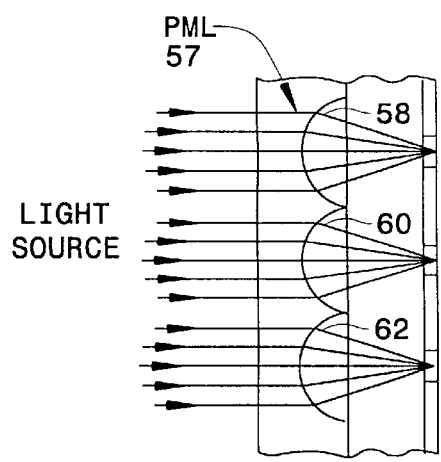
FIG. 5 shows a side cutaway view of a sample portion of a PML with each lenslet focusing light upon an element of a CCD array.

Referring now to FIG. 5, a separate output assembly 64 is shown with an output PML 57 and individual lenslets 58, 60, and 62 as in FIG. 4. This output assembly 64 further includes a charge coupled device (CCD) array 66 which is used to collect the focused light from the lenslets of the output PML 57. A front absorbing CCD array 66 has active regions 68, or pixels, and non-active, or non-absorbing, regions 70. Such non-absorbing regions might consist of a shift register located in the substrate next to each pixel. Such an output PML 57 can be coupled efficiently to the CCD 66. The lenslets 58, 60, and 62 are used to collect the diverging beam from each individual fiber and focus the light onto individual corresponding active regions 68, or pixel sites, on the CCD array 66. By focusing the light onto the pixels, a brighter image can be achieved with decreased heating of the overall CCD array or panel. The size and pattern of the microscopic lenslets may be adjusted to match the structure of the CCD. Various manufacturers are available to engineer and construct PML arrays ranging in different sizes, patterns, and applications.

Figure 5A:
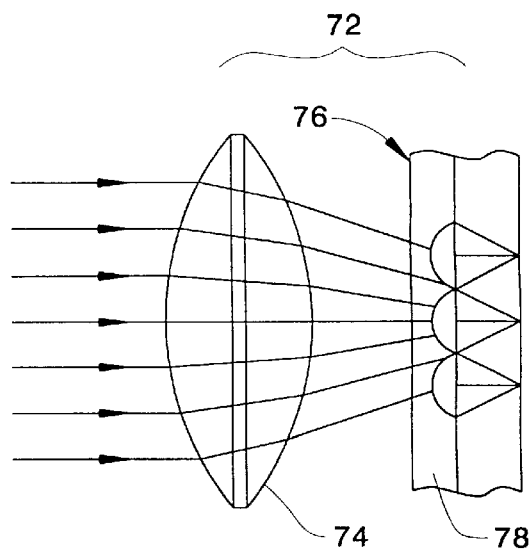
FIG. 5A shows a side cutaway view of an input assembly which uses a lens to focus light upon the face of the PML.

Referring now to FIG. 5A, an input assembly 72 is shown which incorporates a convex lens 74 for collecting a larger amount of imaging light. The lens 74 might consist of a camera lens assembly or the like to further increase the light gathering power of the system. The lens 74 would therefore focus its field of view onto the face 76 of the lenslet array 78.

Figure 6:
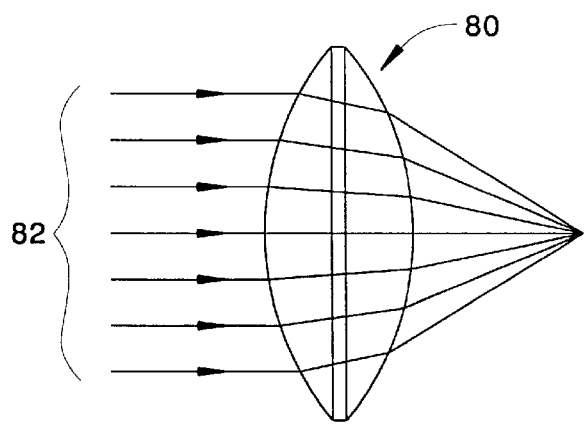

As described above, the lenslet arrays can be constructed using a variety of methods to produce "light bending" surfaces on the PML array, or alternatively on the ends of the fiber optic cables. Referring now to FIG. 6, a conventional lens is shown which can bend light only at its surfaces. At the interface between air and glass, the rays of light 82 will change direction according to the abrupt change in the index of refraction. By carefully controlling the shape and smoothness of the lens surfaces, these rays 81 can be brought to focus and form an image.

Alternatively, it might also be possible to modify the ends of a coherent fiber optic bundle to achieve this same functionality without the need for a separate lenslet array. In this embodiment, the block diagram of the viewing apparatus 10 in FIG. 1 would then not include the input and output PML's 16 and 24, but would instead include steps to indicate and include the modifications to the ends of the optical fibers.

Figure 7:
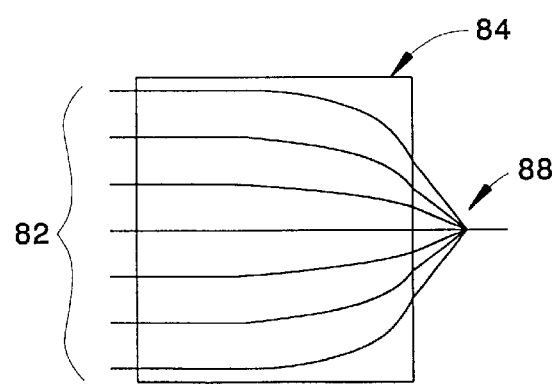

Referring now to FIG. 7, gradient index (GRIN) lenses offers an alternative to polishing of a curvature onto glass lenses. By varying the index of refraction within the lens material 84, light rays 86 are redirected towards a point of focus 88. The SELFOC lens, manufactured by NSG America, is produced by an ion exchange process. This lens allows for coupling light into an optical fiber and its cylindrical geometry makes it possible to put lenses into arrays for the present application.

The SELFOC lens utilizes a radial index gradient with the index of refraction highest at the center of the lens. Wherein the index falls quadratically as a function of radial distance. The resulting parabolic index distribution has a steepness that is determined by the value of the gradient constant. In a SELFOC lens, rays follow sinusoidal paths until reaching the back surface of the lens. The internal structure of this index "gradient" reduces the need for tightly-controlled surface curvature and results in a simple, compact lens geometry. Such GRIN lenses can also be incorporated into similar arrays as shown in FIG. 2 and 2A for application and use with the present invention.

It is to be understood that while I have illustrated and described certain forms of my invention, it is not to be limited to the specific forms or arrangement of parts herein described and shown. It will be apparent to those skilled in the art that various changes may be made without departing from the scope of the invention and the invention is not to be considered limited to what is shown in the drawings and described in the specification.

What I claim is:

1. A blind spot viewing apparatus comprising: a coherent optical fiber cable comprised of a bundle of single optical fibers, said optical fiber cable having a first end and a second end, each said end including a lenslet array means and a focusing lens for focusing an image into or out of each said single optical fiber.

2. The blind spot viewing apparatus of claim 1 wherein said focusing lens is a gradient index lens.

3. The blind spot viewing apparatus of claim 2 wherein said gradient index lens is a SELFOC lens.

4. The blind spot viewing apparatus of claim 1 wherein said lenslet include a gradient index lenslet arrays.

5. The blind spot viewing apparatus to claim 4 wherein said gradient index lenslet arrays include SELFOC brand lenslet arrays.

6. The blind spot viewing apparatus of claim 1, wherein said second ends are sorted into two bundles with a first proximal end of one of said sorted bundles coupled to a light source for illumination of objects at a second distal end of said sorted bundles wherein a second sorted bundle is used for viewing said illuminated objects.

7. The blind spot viewing apparatus of claim 1 wherein said lenslet includes a planar microlens array.

8. The blind spot viewing apparatus of claim 1 wherein the output of said bundle of optical fibers is coupled to a charge coupled device (CCD) array with individual active region pixels being aligned with said individual optical fibers so that light from each individual optical fiber is focused onto corresponding said pixel.

9. A blind spot viewing apparatus comprising: a coherent optical fiber cable comprised of a bundle of single optical fibers, said optical fiber cable having a first end and a second end; an input assembly having first lenslet array made up of individual lenslets, said first lenslet array coupled to said first end of said optical fiber cable, said first lenslet array coupled so that individual lenslets align with and focus light onto the core of each single optical fiber in said optical fiber cable; and a second input assembly having a second lenslet array made up of individual lenslets, said array coupled to said second end of said optical fiber cable, said second lenslet array coupled so that individual lenslets align with and collect light emerging from each single optical fiber for focusing said light towards a viewing position providing for the transfer of a focused image.

10. The blind spot viewing apparatus of claim 9, wherein said input assembly includes a lens assembly means for gathering light from a field of view and focusing said lens field of view onto said first lenslet array.

11. The blind spot viewing apparatus of claim 10, wherein said lens assembly means includes a gradient index lens.

12. The blind spot viewing apparatus of claim 9, wherein said output assembly includes a charge coupled device (CCD) array with individual active region pixels in said viewing position, each said pixel being aligned with said individual lenslets of said second lenslet array so that said lenslets focus upon said pixels.

13. The blind spot viewing apparatus of claim 12, wherein said CCD device is coupled to an optical viewing device.

14. The blind spot viewing apparatus of claim 9, wherein said first and second lenslet arrays include gradient index lens arrays.

15. A The blind spot viewing apparatus of claim 14, wherein said gradient lens arrays include SELFOC brand lens arrays.

16. The blind spot viewing apparatus of claim 9, wherein said input assembly and output assembly lenslet arrays include a planar microlens array.

17. A blind spot viewing apparatus comprising: a coherent optical fiber cable comprised of a bundle of single optical fibers, said optical fiber cable having a first end and a second end; said first end of each said single optical fiber modified to include an attached lenslet means for focusing light entering each said single fiber; said second end of each said optical fiber modified to include an attached lenslet means for focusing light emerging from each said single fiber onto a viewing position.

18. The blind spot viewing apparatus of claim 17, wherein said viewing position includes a charge coupled device (CCD) array with individual active region pixels, each said pixel being aligned with said individual optical fiber lenslets on said second end of said optical fibers, so that said lenslets focus light upon said pixels.

19. The blind spot viewing apparatus of claim 18 wherein said CCD device is coupled to an optical viewing device.

20. The blind spot viewing apparatus of claim 18 wherein said lenslet on said first and second ends of said optical fibers includes a gradient index lens.

* * * * *

UNITED STATES PATENT AND TRADEMARK OFFICE
CERTIFICATE OF CORRECTION

PATENT NO.   : 5,815,624
DATED        : September 29, 1998
INVENTOR(S)  : Gary J. Rose It is certified that error appears in the above-identified patent and that said Letters Patent is hereby corrected as shown below:

Please correct Inventor's last name to read --ROSE --, instead of "Rosenberg".

Signed and Sealed this

Fourteenth Day of August, 2001

*Attest:*

*Attesting Officer*

NICHOLAS P. GODICI
*Acting Director of the United States Patent and Trademark Office*